United States Patent
Hartmann et al.

(10) Patent No.: US 10,454,324 B2
(45) Date of Patent: Oct. 22, 2019

(54) DYNAMO-ELECTRICAL MACHINE WITH SEGMENTED STATOR STRUCTURE AND/OR ROTOR STRUCTURE

(71) Applicant: SIEMENS AKTIENGESELLSCHAFT, München (DE)

(72) Inventors: Ulrich Hartmann, Berlin (DE); Martin Junge, Grafenau (DE); Daniel Kermas, Berlin (DE); Friederike Richter, Berlin (DE); Klaus Schifferer, Neuburg am Inn (DE); Gordon Trogisch, Strausberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 1143 days.

(21) Appl. No.: 14/650,146

(22) PCT Filed: Nov. 27, 2013

(86) PCT No.: PCT/EP2013/074841
§ 371 (c)(1),
(2) Date: Jun. 5, 2015

(87) PCT Pub. No.: WO2014/086633
PCT Pub. Date: Jun. 12, 2014

(65) Prior Publication Data
US 2015/0318741 A1    Nov. 5, 2015

(30) Foreign Application Priority Data

Dec. 6, 2012   (DE) .................. 10 2012 222 449

(51) Int. Cl.
*H02K 1/18*  (2006.01)
*H02K 1/28*  (2006.01)
(Continued)

(52) U.S. Cl.
CPC .............. *H02K 1/18* (2013.01); *F03D 9/25* (2016.05); *F03D 15/20* (2016.05); *F03D 80/70* (2016.05);
(Continued)

(58) Field of Classification Search
CPC .. H02K 1/18; H02K 1/12; H02K 1/28; H02K 7/1838; H02K 2213/12; F03D 9/25;
(Continued)

(56) References Cited

U.S. PATENT DOCUMENTS 4,038,801 A * 8/1977 Busch ...................... E04B 9/20
52/698
6,779,957 B2 * 8/2004 Ozawa ................. B62D 25/147
411/311

(Continued)

FOREIGN PATENT DOCUMENTS

| DE | 10 2005 022 202 A1 | 7/2006 |
| DE | 10 2010 061 966 A1 | 1/2012 |
| WO | WO 03/056192 A1 | 7/2003 |

OTHER PUBLICATIONS

"Kegelscheiben Kegelpfannen (Spherical washers, conical seats), DIN 6319, Oct. 2001"; DIN Deutsches Institut für Normung e. V., Berlin; pp. 1-4; 2001: DE.

*Primary Examiner* — Bernard Rojas
(74) *Attorney, Agent, or Firm* — Henry M. Feiereisen LLC

(57) ABSTRACT

A dynamo-electrical machine includes a stator and a rotor rotatable relative to the stator about an axis of rotation, the stator and/or the rotor having a plurality of segments arranged one after another in a rotational direction of the rotor, the segments each having opposing ends facing in opposite rotational directions, and being provided with flanges on the opposing ends, with respective flanges of neighboring ones of the segments in confronting relation- (Continued)

ship, each of the flanges having at least one hole oriented in the rotational direction, the at least one hole of at least one of the respective confronting flanges having an internal thread and threadably receiving a sleeve having an external thread, the respective confronting flanges being spaced apart by the sleeve, wherein a screw is received through the at least one hole of the one of the respective confronting flanges and through the sleeve and engages in the at least one hole of the other one of the respective confronting flanges, thereby exerting a force on the one of the respective confronting flanges, and connects the respective confronting flanges to each other via the sleeve.

9 Claims, 5 Drawing Sheets

(51) Int. Cl.
  *F03D 15/20* (2016.01)
  *F03D 80/70* (2016.01)
  *F16B 5/02* (2006.01)
  *H02K 1/12* (2006.01)
  *F16B 43/02* (2006.01)
  *F16B 19/02* (2006.01)
  *F03D 9/25* (2016.01)
  *H02K 7/18* (2006.01)

(52) U.S. Cl.
  CPC ............ *F16B 5/0233* (2013.01); *F16B 19/02* (2013.01); *F16B 43/02* (2013.01); *H02K 1/12* (2013.01); *H02K 1/28* (2013.01); *H02K 7/1838* (2013.01); *H02K 2213/12* (2013.01); *Y02E 10/725* (2013.01)

(58) Field of Classification Search
  CPC ........ F16B 5/0233; F16B 19/02; F16B 43/02; Y02E 10/725
  USPC .......................... 310/216.008, 216.009, 432
  See application file for complete search history.

(56) References Cited

U.S. PATENT DOCUMENTS

| | | |
|---|---|---|
| 2004/0265090 A1 | 12/2004 | Stone |
| 2011/0210560 A1* | 9/2011 | Mancuso ............... H02K 1/146 290/55 |
| 2011/0236213 A1* | 9/2011 | Bryk .................... F01D 25/243 416/204 A |
| 2011/0266913 A1 | 11/2011 | Dawson |
| 2012/0133145 A1 | 5/2012 | Haran |
| 2015/0222151 A1* | 8/2015 | Semken ................. H02K 1/148 310/216.008 |
| 2016/0056676 A1* | 2/2016 | Ward ....................... H02K 1/28 310/216.008 |
| 2016/0164356 A1* | 6/2016 | Sakurai .................... H02K 1/28 310/156.13 |
| 2016/0380491 A1* | 12/2016 | Krompasky ............. H02K 1/24 310/179 |

* cited by examiner

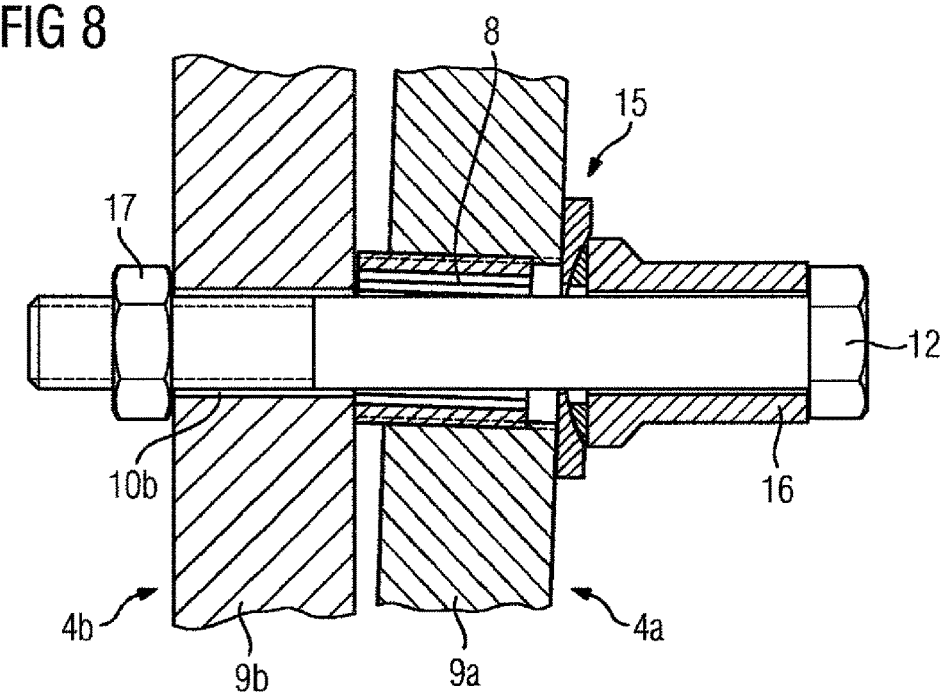
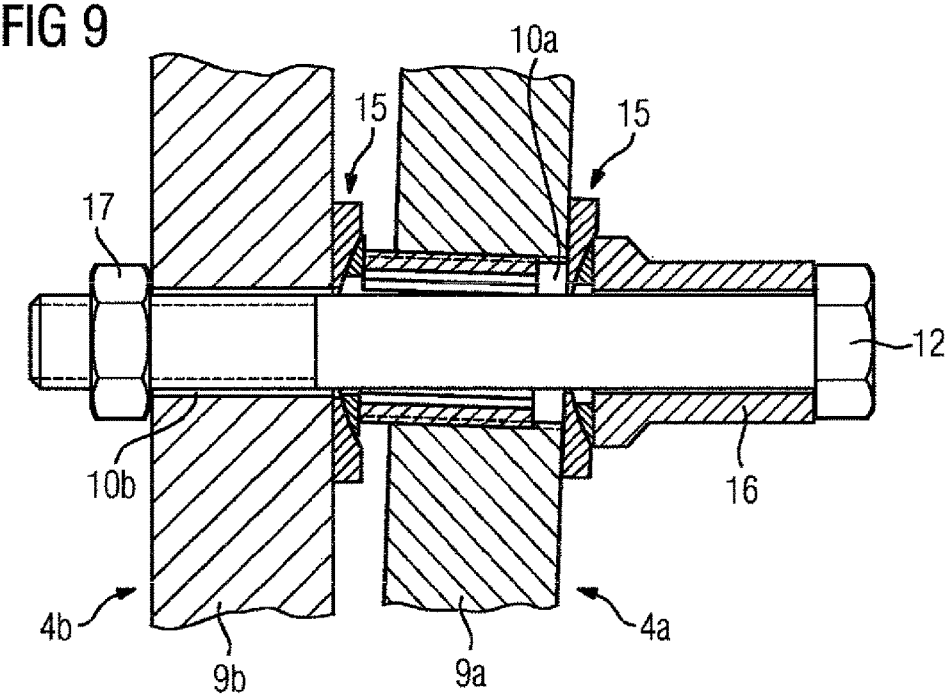

DYNAMO-ELECTRICAL MACHINE WITH SEGMENTED STATOR STRUCTURE AND/OR ROTOR STRUCTURE

CROSS-REFERENCES TO RELATED APPLICATIONS

This application is the U.S. National Stage of International Application No. PCT/EP2013/074841, filed Nov. 27, 2013, which designated the United States and has been published as International Publication No. WO 2014/086633 A2 and which claims the priority of German Patent Application, Serial No. 10 2012 222 449.1, filed Dec. 6, 2012, pursuant to 35 U.S.C. 119(a)-(d).

BACKGROUND OF THE INVENTION

The invention relates to a dynamo-electrical machine, in particular a large dynamo-electrical machine with power outputs of greater than 1 MW. Said machines are frequently designed with a segmented structure in order to eliminate problems of transportation by road and rail. In this case, either the rotor of the machine, the stator of the machine or both the stator and the rotor may be designed to be segmented. Problems arise when assembling these segments during the assembly of the segments to form a complete stator ring or rotor ring, due to manufacturing tolerances of the respective segments. Thus difficulties occur during assembly, for example, due to the tolerances of the pitch angle of the segments or by an offset of through-holes of two segments which are arranged one after another in the rotational direction of the stator or rotor and which are intended to be connected together.

Hitherto, during the assembly of the segments, the gaps produced between the segments were therefore machined, either in particular by material-removing machining of the gap, for example, which has a high requirement for accuracy in order to minimize tolerances, or the gap between the segments to be connected together was lined with inserts in order to fix the segments to be connected together by a simple conventional screw connection. However, this ultimately leads to complex and awkward operations, in particular during the final mounting on site.

SUMMARY OF THE INVENTION

Proceeding therefrom, the object of the invention is to provide a dynamo-electrical machine with a segmented structure in which the segments of the stator and/or of the rotor of this dynamo-electrical machine may be assembled in a simple manner, so that it is possible to compensate for tolerances and additionally these segments are prevented from shifting independently.

This object is achieved by a dynamo-electrical machine with a stator and a rotor which is rotatably arranged relative to the stator about an axis of rotation, wherein the stator and/or the rotor has a plurality of segments arranged one after another in the rotational direction of the rotor, wherein the segments have a flange at the side ends thereof in the rotational direction for connection to segments arranged adjacent thereto in the rotational direction, wherein the flanges have at least one hole in the rotational direction, wherein flanges facing one another at the side ends in the rotational direction of segments arranged adjacent to one another are connected to one another by a screw connection passing through a hole, wherein to connect the flanges facing one another, a sleeve having an external thread is arranged in the hole of at least one of the flanges facing one another at the side ends in the rotational direction, wherein the hole of at least one of the flanges facing one another at the side ends in the rotational direction has an internal thread, wherein the sleeve is screwed into the internal thread of the hole, wherein the sleeve creates a spacing between the flanges facing one another, wherein a screw passes through the holes of the flanges facing one another at the side ends in the rotational direction, and through the sleeve, wherein the screw, in particular the screw head, exerts a force on the flange and via the sleeve connects the flanges facing one another.

According to the invention, at least one of the flanges facing one another at the side ends in the rotational direction now has an internal thread, wherein a sleeve is screwed into the internal thread of the hole, wherein the sleeve creates a spacing between the flanges facing one another, wherein a screw passes through the holes of the flanges facing one another at the side ends in the rotational direction, and through the sleeve, wherein the screw exerts a force on the flange, in particular through its screw head, and via the sleeve thus connects the flanges facing one another. As a result, therefore, a particularly simple screw connection is permitted between two segments to be connected. The support is now provided on the surrounding flange, so that by the applied pretensioning the sleeve is prevented from independent rotation and a connection without clearance is made between the two flanges or respectively the segments.

If the two holes facing one another have internal threads, said holes are provided, in particular, with different diameters.

Moreover, it proves advantageous if the other hole of the flanges facing one another at the side ends in the rotational direction also has an internal thread and the screw is screwed into the internal thread of the other hole. By this measure, the use of a nut on the screw for fixing the flange may be dispensed with.

However, with a longer screw, said screw may be inserted through the second hole and locked by a nut.

The use of one or more universal ball joints in the gap and/or on the side of the screw head, which provides further tolerance compensation and avoids bending moments from the screw, is particularly advantageous.

A dynamo-electrical machine designed in such a manner may be used in this case as an electric motor, for example as a drive in tube mills or as a generator. In this case, in particular, the application is suitable for wind energy generators, in particular directly driven wind energy generators. By means of the connection of the segments according to the invention, it is no longer essential to carry out highly accurate material-removing machining of the flanges. This reduces the production costs of such segments.

BRIEF DESCRIPTION OF THE DRAWING

The invention and further advantageous embodiments of the invention are described in more detail with reference to schematically shown exemplary embodiments, in which:

FIGS. 4 to 9 show very different embodiments of the connection of two segments by means of a sleeve.

DETAILED DESCRIPTION OF PREFERRED EMBODIMENTS

Figure 1:
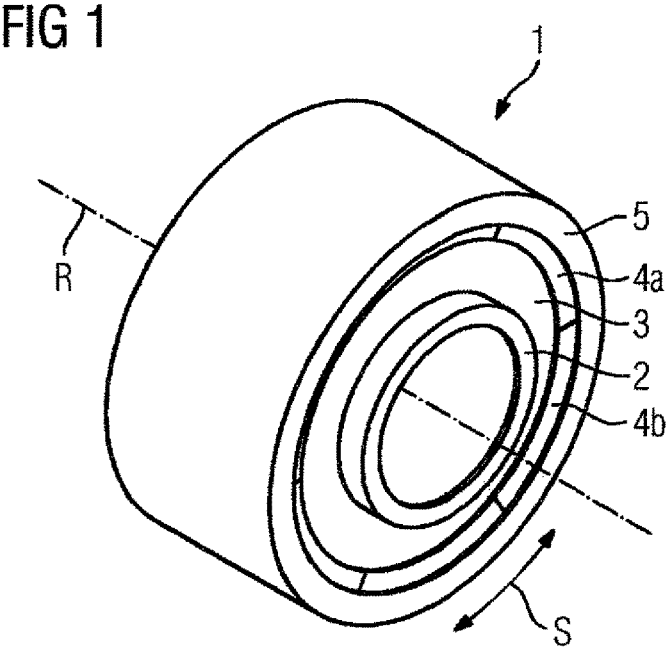
FIG. 1 shows a dynamo-electrical machine according to the invention in a perspective view.

FIG. 1 shows in a perspective basic sketch a dynamo-electrical machine 1 according to the invention. The dynamo-electrical machine 1 has a rotor 5 which is rotatably arranged about a rotational axis R, said rotor during operation of the dynamo-electrical machine rotating about the rotational axis R in the rotational direction S. Moreover, the dynamo-electrical machine 1 comprises a stator 4 which is arranged in a stationary manner and which in the context of this exemplary embodiment is positioned via bearings on a shaft 2 by means of a supporting device. The stator 4 has segments 4a, 4b arranged one after another in the rotational direction S of the rotor 5, wherein for the sake of clarity only two segments have been provided with reference numerals. The segments in this case are arranged to form a ring. The supporting device 3 connects the shaft 2 to the segments of the stator 4 via bearings. Within the context of this exemplary embodiment the dynamo-electrical machine 1 is designed as a so-called external rotor, i.e. during the operation of the dynamo-electrical machine the rotor 5 rotates about the centrally arranged stator 4.

Alternatively, the dynamo-electrical machine according to the invention may also be produced as an internal rotor, in which the stator 4 is also arranged in a stationary manner but encompasses the rotor 5 in the peripheral direction.

Figure 2:
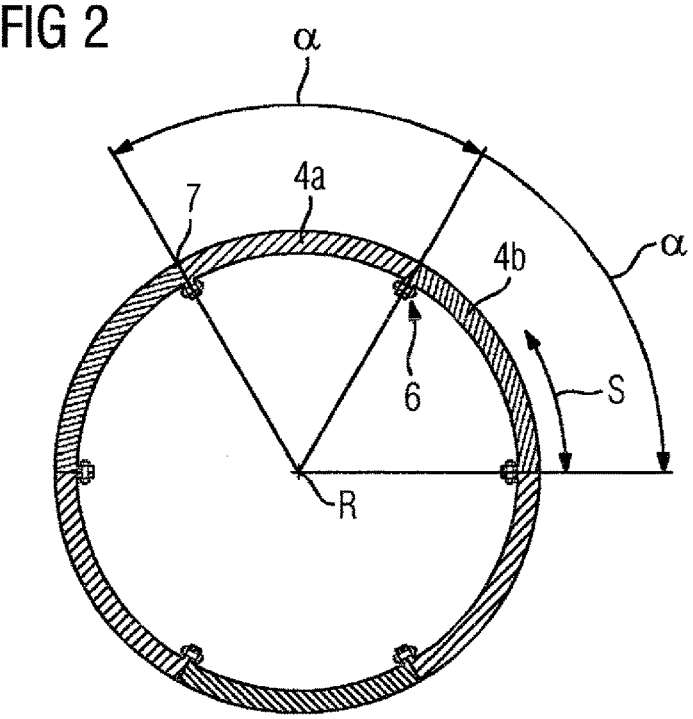
FIG. 2 shows a cross section of a stator of the dynamo-electrical machine.

FIG. 2 shows in a schematic view a cross section of the stator 4 of the dynamo-electrical machine 1 according to the invention. The stator 4 has a plurality of segments arranged one after another in the rotational direction S of the rotor 5, said segments forming a ring when assembled. In this case only the two segments 4a, 4b arranged adjacent in the rotational direction S are provided with reference numerals in FIG. 2. Within the context of the exemplary embodiment, in this case the stator 4 has six segments, wherein the segments have a pitch angle α which is slightly less than 60°, so that a gap is produced between the segments when the segments are assembled to form the ring. In FIG. 2 for the sake of clarity only the gap 7 is provided with a reference numeral. The segments are connected together by screw connections to form the ring, wherein in FIG. 2 only one screw connection 6 is provided with a reference numeral.

Naturally, the segments may also have different pitch angles α, but ultimately the transportation and the handling at the installation determine the size of the pitch angle.

In contrast to the prior art, in the present invention the gap 7 between the segments is not lined with material and thus the gap 7 is not filled in, but the gap 7 is maintained as an air gap and the flanges 9a, 9b are connected together by a screw connection according to the invention. The flanges 9a and 9b which face one another at the side ends 13a and 13b in the rotational direction of the segments 4a and 4b arranged adjacent to one another are connected together by a screw connection according to the invention which passes through the hole 10a and 10b thereof.

Figure 3:
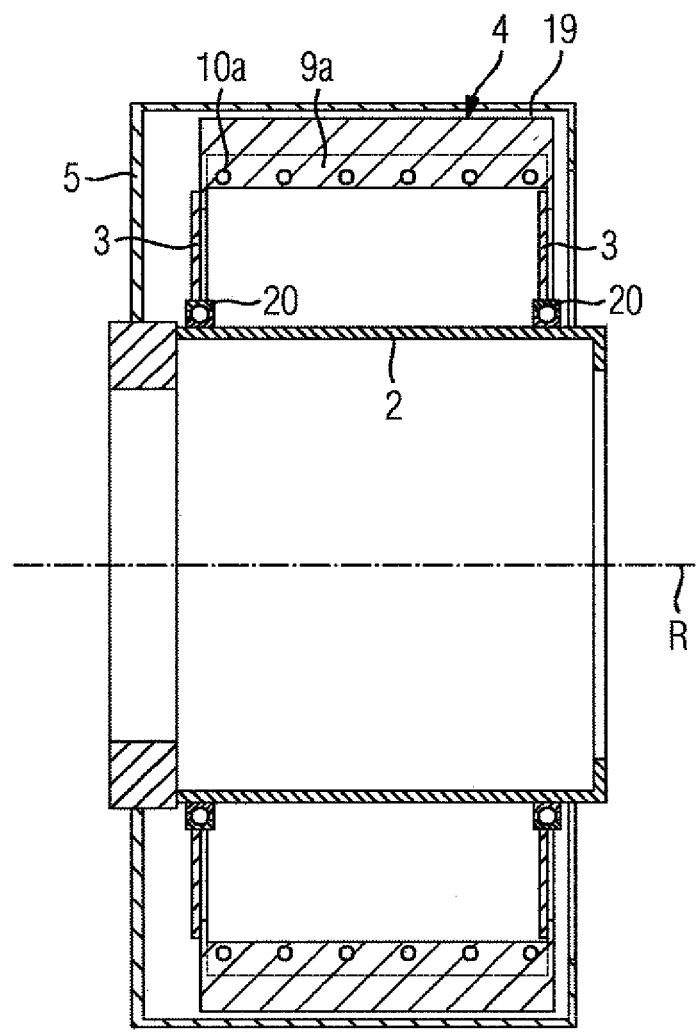
FIG. 3 shows a longitudinal section of the dynamo-electrical machine extending through the gap between two segments.

FIG. 3 shows a basic view of an external rotor generator in longitudinal section. A shaft 2 drives the rotor 5, which interacts electromagnetically with the stator 4 via the air gap 19 of the dynamo-electrical machine and produces electrical energy. The stator 4 in this case is supported on the rotating shaft 2 by a supporting device 3 and by bearings 20.

Permanent magnets are arranged on the rotor 5 opposite the stator 4. The stator 4 is fastened to the nacelle of the wind energy installation via a torque support, not shown in more detail.

In this case, the flange 9a has a plurality of holes arranged in the direction of the rotational axis R along the flange, wherein in FIG. 3 only the hole 10a is provided with a reference numeral. Within the context of the exemplary embodiment, the screw connection shown according to the invention is thus repeatedly present in the direction of the rotational axis R along the flanges of the segments.

However, it should be noted here that in an extreme case, the flanges may also have just one respective hole which serves to connect segments arranged adjacent to one another in the rotational direction S.

In principle, permanent magnets are arranged on the periphery of the rotor 5 for producing a magnetic field, said permanent magnets being aligned in the direction of the stator 4. For reasons of clarity, however, said permanent magnets are not shown in the figures. Similarly, the winding system present in the stator 4 is not shown, said winding system being required to interact electromagnetically with the permanent magnets of the rotor 5 and thus to function as a drive or generator. The winding system of the stator 4 and/or of the segment may in this case be a single-layer winding or double-layer winding made of form-wound coils which advantageously have the same winding pitch and on the front faces of the stator 4 represent a two-stage or three-stage winding.

Advantageously, each segment has a complete winding system, i.e. after mounting, no coils have to be inserted into the grooves of the stator 4 which extend beyond the limits of the segments. The segment together with its winding system may therefore be electrically tested, cast, etc. in the factory. The segments may be connected together at the installation in the manner according to the invention. Moreover, the electrical connections have to be produced of the coil starts and coil ends of the respective phases.

Figure 4:
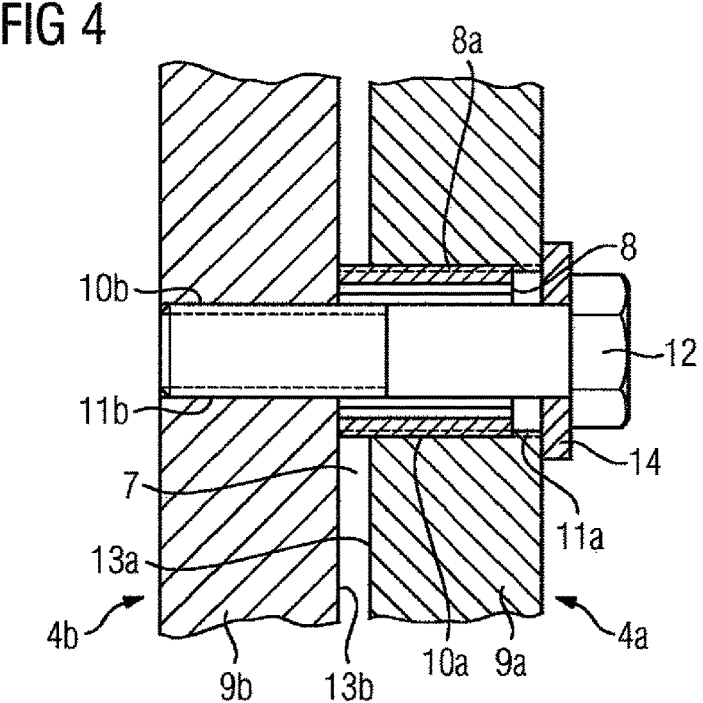

According to FIG. 4 the holes 10a, 10b of the flanges 9a, 9b comprise internal threads 11a, 11b. A sleeve 8 comprising an external thread 8a is screwed into the internal thread 11a, wherein the sleeve 8 creates a spacing between the flanges 9a and 9b facing one another. The sleeve 8 has a width and/or an axial length which is smaller than the width of the flange plus the width of the gap 7. As a result, the action of the force of the screw connection may extend to the flange 9b.

A screw 12 passes through the holes of the flanges 9a and 9b facing one another at the side ends 13a, 13b in the rotational direction, and through the sleeve 8, the thread 12a of said screw being screwed into the internal thread 11a of the hole 10a of the flange 9a. The screw 12 exerts a force on the flange 9b and connects the flanges 9a and 9b facing one another via this introduction of force. By this arrangement, a gap 7 which is present due to manufacturing tolerances etc. may be bridged by a non-positive connection and thus "blocked" and/or fixed.

The action of force is supported on the surrounding flange 9b. By the pretensioning applied onto the sleeve 8, which is also denoted as a threaded bushing, said sleeve is prevented from independently twisting and a connection of the respective segments 4a, 4b is formed without clearance. Advantageously, for rotating the sleeve 8 said sleeve may be provided with one or more slots on the front face or with an internal polygon, for example a hexagon or octagon.

Figure 5:
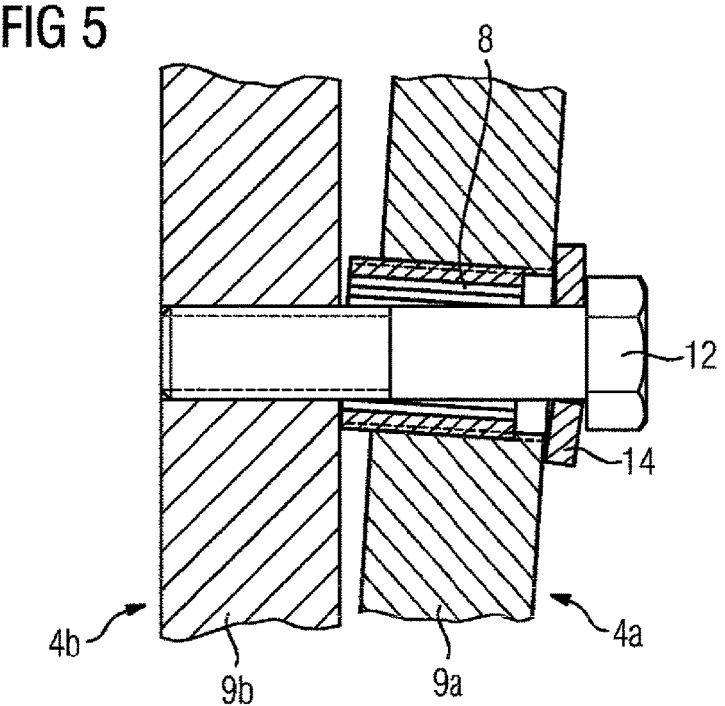

FIG. 5 shows a further exemplary embodiment of two segments 4a, 4b to be connected together, said segments being offset to one another. If the bearing surfaces of the screw 12 on the flange 9*a* are not perpendicular, this produces an additional bending moment in the screw 12. In order to reduce this effect, in addition to the known elements such as the sleeve 8 and the screw 12, a clamping plate 14 is inserted between the head of the screw 12 and the flange 4*a*. Thus an additional bending moment in the screw 12 would be avoided if the boreholes of the two flanges 9*a* and 9*b* were not aligned.

This reduction in the additional bending moment is implemented by a reduced bearing radius of the head of the screw 12 on a clamping plate 14. Amongst other things, the clamping plate 14 is also used to compensate for setting losses of the screw connection 6.

Figure 6:
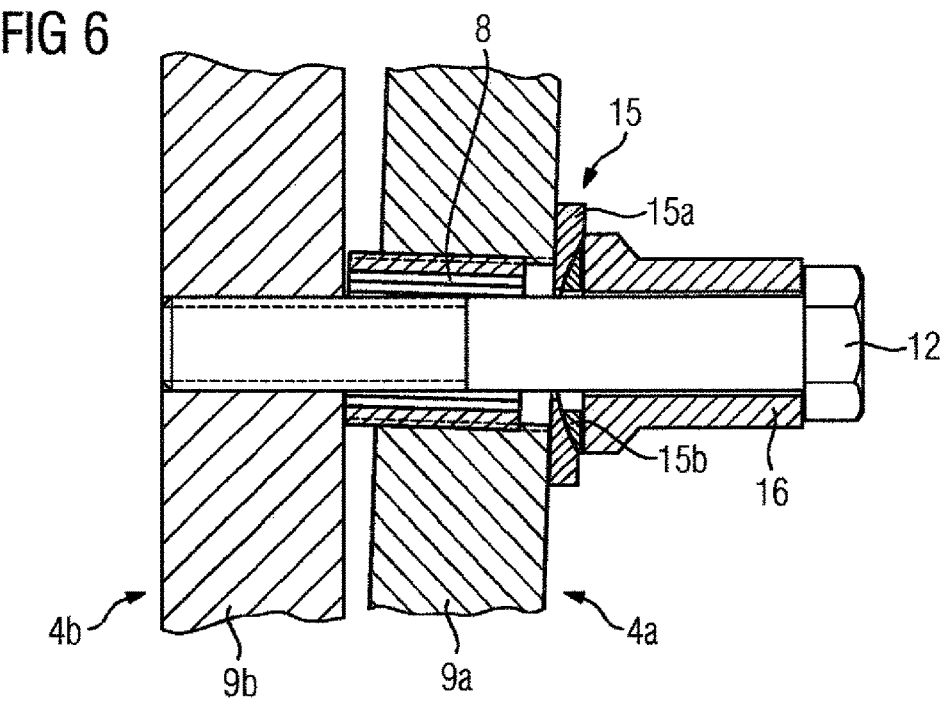

FIG. 6 shows in a further embodiment another possibility for avoiding this additional bending moment in the screw 12. In this case, a connection of the two segments 4*a* and 4*b* is provided on the bearing surface between the screw head and the flange 9*a* by means of a universal ball joint 15 consisting of a spherical cup 15*a* and a spherical disk 15*b* and also a resilient sleeve 16. Thus any forces which could damage the screw connection are compensated. For achieving a sufficient clamping length of the screw 12, a resilient sleeve 16 is advantageously used. This arrangement also serves, in particular, to compensate for deviations in the parallelism of the bearing surfaces.

Figure 7:
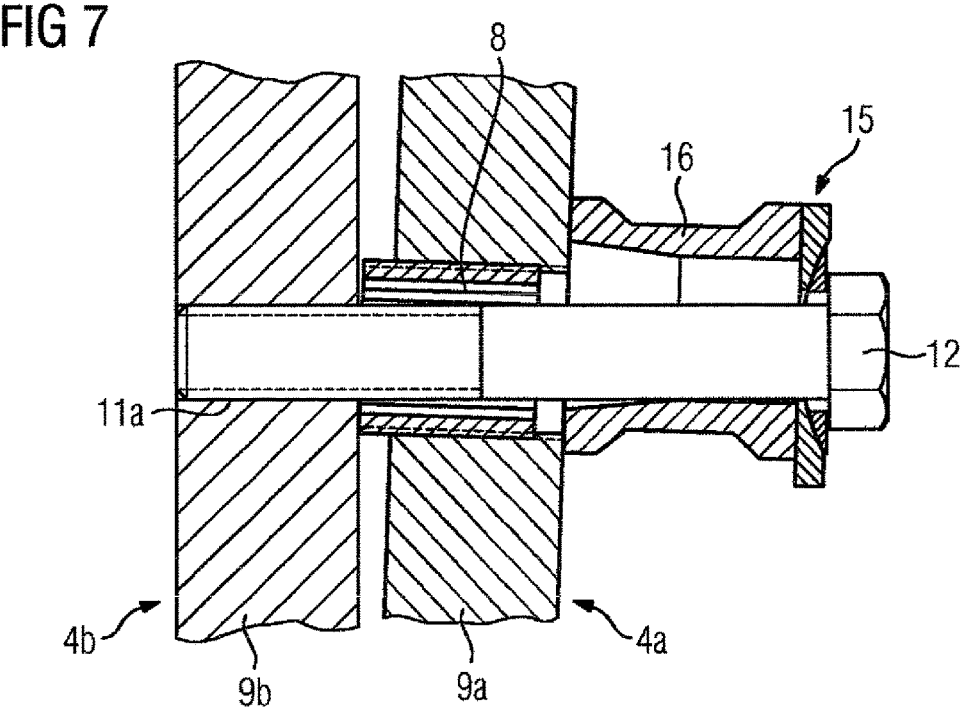

FIG. 7 shows a further arrangement in which the bending moments are also compensated. In this case, the universal ball joint 15 is now attached between the screw head and the resilient sleeve 16.

FIG. 8 shows a similar embodiment to FIG. 6 but in this case the screw 12 is designed to be axially longer so that at the end of the hole 10*b* of the segment 4*a* it may be locked by a nut 17. The hole 10*b* is in this case designed as a through-hole without a thread. In this case, the universal ball joint 15 may also be arranged on the nut side.

FIG. 9 shows in a further embodiment a screw connection 6 of two segments 4*a*, 4*b* which has a universal ball joint 15 both in the gap 7, i.e. between the flanges 4*a*, 4*b*, and also on the side of the flange 4*a* facing the head of the screw 12. Additionally a resilient sleeve 16 is provided on this side of the flange 4*a* facing the screw head. Thus bending moments are also avoided in the screw 12, said bending moments being able to be produced in the case of very high alignment tolerances of the two holes 10*a* and 10*b*, as is the case, amongst others, of surfaces which are oblique relative to one another.

The embodiment according to the invention of the connection of segments of stators 4 and/or rotors 5 is suitable, in particular, for wind energy installations or tube mills. With large diameters of the stator 4 and/or the rotor 5, therefore, the segments thereof may be transported individually to the installation and by the connection of these segments according to the invention it is possible to compensate for tolerances in a simple manner during mounting. As a result, a uniform air gap 19 of the dynamo-electrical machine is provided, so that distortions of the sine-wave form of the current produced by generator are avoided. Moreover, uneven magnetic tractive forces are avoided and this, amongst other things, extends the service life of the bearings.

The invention claimed is:

1. A dynamo-electrical machine, comprising:
a stator and a rotor rotatable relative to the stator about an axis of rotation, said stator and/or said rotor having a plurality of segments arranged one after another in a rotational direction of the rotor,
said segments each having opposing ends facing in opposite rotational directions, and being provided with flanges on the opposing ends, with respective flanges of neighboring ones of the segments in confronting relationship, each of said flanges having at least one hole oriented in the rotational direction,
said at least one hole of at least one of the respective confronting flanges having an internal thread and threadabiy receiving a sleeve having an external thread, said respective confronting flanges being spaced apart by the sleeve,
wherein a screw having a shaft and a head is received through the at least one hole of the one of the respective confronting flanges and through the sleeve and engages in the at least one hole of the other one of the respective confronting flanges, thereby exerting a force on the one of the respective confronting flanges and connects the respective confronting flanges to each other via the sleeve,
wherein the at least one hole of the other one of the respective confronting flanges has no internal thread and the screw engages in the at least one hole of the other one of the respective confronting flanges hole,
wherein the force of the screw exerted on the one of the respective confronting flanges is implemented via a universal ball joint which consists of a spherical cup and a spherical disk, said universal ball joint arranged on the one of the respective confronting flanges, and
a resilient sleeve surrounding only the shaft of the screw between a head of the screw and the one of the respective confronting flanges to achieve a clamping length of the screw and compensate for deviations in parallelism of bearing surfaces, said resilient sleeve having a first external diameter and a second larger external diameter.

2. The dynamo-electrical machine of claim 1, wherein a head of the screw exerts the force on the one of the respective confronting flanges.

3. The dynamo-electrical machine of claim 1, further comprising a further universal ball joint arranged in a gap between the respective confronting flanges.

4. The dynamo-electrical machine of claim 1, wherein the sleeve is pretensioned by a threaded bushing.

5. The dynamo-electrical machine of claim 1, wherein the machine is constructed as an electric motor or generator.

6. The dynamo-electrical machine of claim 1, wherein the dynamo-electrical machine constructed for use as a wind energy generator or as a drive for a tube mill.

7. The dynamo-electrical machine as claimed in claim 5, wherein the generator is configured as a directly driven wind energy generator.

8. A wind energy installation comprising a generator of claim 1, wherein the generator and/or the rotor is fastened via at least one bearing unit to a nacelle of the wind energy installation.

9. The wind energy installation of claim 8, wherein the generator is constructed as a directly driven generator.

* * * * *